L. J. POWERS.
HORSE COLLAR.
APPLICATION FILED DEC. 24, 1907.
899,560.
Patented Sept. 29, 1908.
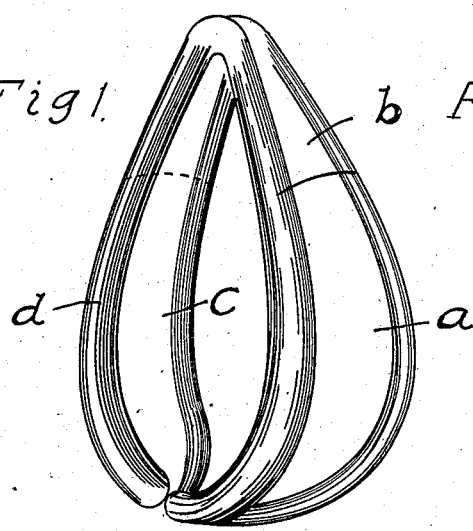
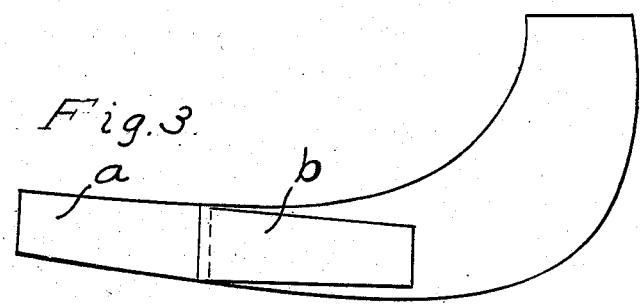
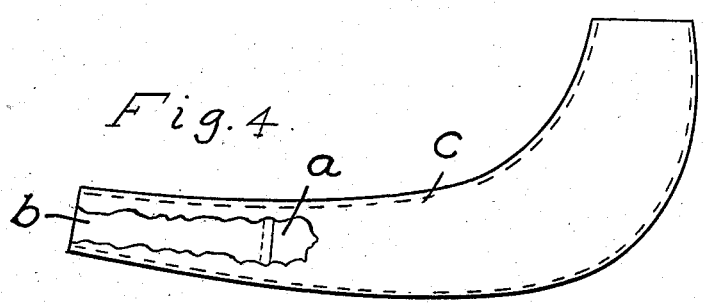
WITNESSES:
INVENTOR
LEONARD J. POWERS.
BY
ATTORNEY

UNITED STATES PATENT OFFICE.

LEONARD J. POWERS, OF WATERLOO, IOWA, ASSIGNOR TO THE POWERS MANUFACTURING COMPANY, OF WATERLOO, IOWA.

HORSE-COLLAR.

No. 899,560.

Specification of Letters Patent.

Patented Sept. 29, 1908.

Original application filed February 28, 1907, Serial No. 359,830. Divided and this application filed December 24, 1907. Serial No. 407,948.

*To all whom it may concern:*

Be it known that I, LEONARD J. POWERS, a citizen of the United States of America, and a resident of Waterloo, Blackhawk county, Iowa, have invented certain new and useful Improvements in Horse-Collars, of which the following is a specification.

My invention relates to improvements in horse-collars, and the object of my improvement is to provide a water-proof covering for the outer surface of the upper or neck portion of a collar, adapted to shed moisture or rain, and thus prevent chafing of the animal's neck or the soaking of the collar.

This invention is a division of the application for patent filed by me on February 28th, 1907, under Serial Number 359,830.

The above object I have attained by the following means, which are described and claimed hereinafter, and illustrated in the accompanying drawings, in which:—

Figure 1 is a perspective of a horse-collar equipped with my improved water-proof top cover. Fig. 2 is a side elevation of the same. Fig. 3 is a plan diagram of one of the side-members of the outer covers, showing one member of the water-proof cover laid thereon with its outer surface under and secured at one end to said cover. Fig. 4 is a plan diagram of the said outer cover member with the under cover side member laid thereon, the said water-proof piece having been turned over and all the curved longitudinal edges of the pieces being secured together.

Similar letters refer to similar parts throughout the several views.

My improved collar consists of tubular structures, connected together, the covers being made in the forms shown at $a$ and $c$, $a$ being one of the outer side-members and $c$ one of the inner or under side-members of substantially the same size and shape and formed of any suitable material, such as canvas. When these covers are united along their longitudinal curved edges and secured together at one end to form a continuous tubular structure, the tube or pair of communicating pouches thus formed is secured to the neck-pad $d$ as shown in Fig. 1.

In order to provide a water-proof cover for the upper part of the collar which shall shed water, but not being continuous around it, will not chafe the neck or prevent the pad from absorbing the animal's sweat, I have adopted the following means for economically and easily effecting that purpose.

Before the covers $a$ and $c$ are secured together, the piece $b$, being one-half of the water-proof material cut to the same form and size as the upper part of said member $a$, is laid upside down upon the member $a$ so that when stitched together as shown in Fig. 3, and turned over, the seam is concealed under said piece $b$. After the piece $b$ has been turned over, and the under cover-member $c$ superposed thereon so as to be registered with $a$, the curved longitudinal edges are stitched together, and then the tube thus formed is turned inside out, which brings the piece $b$ outside with its water-proof surface displayed, and then the pouches thus formed for each side may be secured together at the top, with the abutting ends of the water-proof pieces $b$ secured together thereover. The said arrangement makes a cheaply constructed cover, and the water-proof overall sheds rain at the ridge of the collar where needed.

Having described my invention, what I claim as new, and desire to secure by Letters Patent, is:—

A horse-collar, consisting of the combination of communicating pad-covers adapted to be stuffed continuously throughout and secured together at their middle or neck portion, with water-proof pieces adapted to cover when secured together at their abutting ends only the upper outside portion of said collar only, the seams of the lower ends of each piece being concealed under the reversed portion of such piece.

Signed at Waterloo, Iowa, this 10th day of Dec. 1907.

LEONARD J. POWERS.

Witnesses:
G. C. KENNEDY,
O. D. YOUNG.